United States Patent
Kuehnle et al.

(10) Patent No.: US 9,547,078 B2
(45) Date of Patent: Jan. 17, 2017

(54) DETECTION OF RADAR OBJECTS USING A RADAR SENSOR OF A MOTOR VEHICLE

(71) Applicant: Robert Bosch GmbH, Stuttgart (DE)

(72) Inventors: Goetz Kuehnle, Hemmingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 13/937,841

(22) Filed: Jul. 9, 2013

(65) Prior Publication Data
US 2014/0022111 A1 Jan. 23, 2014

(30) Foreign Application Priority Data

Jul. 23, 2012 (DE) .................. 10 2012 212 888

(51) Int. Cl.
*G01S 13/58* (2006.01)
*G01S 7/35* (2006.01)

(52) U.S. Cl.
CPC ........ *G01S 13/584* (2013.01); *G01S 2007/356* (2013.01)

(58) Field of Classification Search
CPC ................ G01S 2007/356; G01S 2007/2883
USPC ........................................................ 342/109
See application file for complete search history.

(56) References Cited

U.S. PATENT DOCUMENTS

| | | | |
|---|---|---|---|
| 8,179,303 B2 | 5/2012 | Kishida et al. | |
| 2008/0088500 A1* | 4/2008 | Ishii | G01S 13/345 342/109 |
| 2010/0033365 A1 | 2/2010 | Kishida et al. | |
| 2011/0309968 A1* | 12/2011 | Reiher | G01S 7/354 342/70 |
| 2012/0235854 A1* | 9/2012 | Testar | G01S 7/35 342/109 |

FOREIGN PATENT DOCUMENTS

| | | |
|---|---|---|
| DE | 10 2005 048 209 | 4/2007 |
| DE | 602 16 027 | 6/2007 |
| FR | 2 961 604 A1 | 12/2011 |
| WO | 2006/134912 A1 | 12/2006 |
| WO | WO 2011/066993 | 6/2011 |

* cited by examiner

*Primary Examiner* — Peter Bythrow
*Assistant Examiner* — Helena Seraydaryan
(74) *Attorney, Agent, or Firm* — Norton Rose Fulbright US LLP; Gerard Messina

(57) ABSTRACT

In a method for detecting radar objects with the aid of a radar sensor of a motor vehicle, a transmitted signal has a sequence of frequency modulations, to each of which a partial signal of a measuring signal is assigned; first information about the relative velocity and the distance of a radar object is ascertained based on a frequency spectrum of at least one of the partial signals; second information about the relative velocity and the distance of the radar object is ascertained based on a frequency spectrum of a time curve of values of frequency spectra of the partial signals at a frequency position of the radar object in these frequency spectra; and the relative velocity and the distance of the radar object are ascertained based on matching of the first information with the second information.

14 Claims, 7 Drawing Sheets

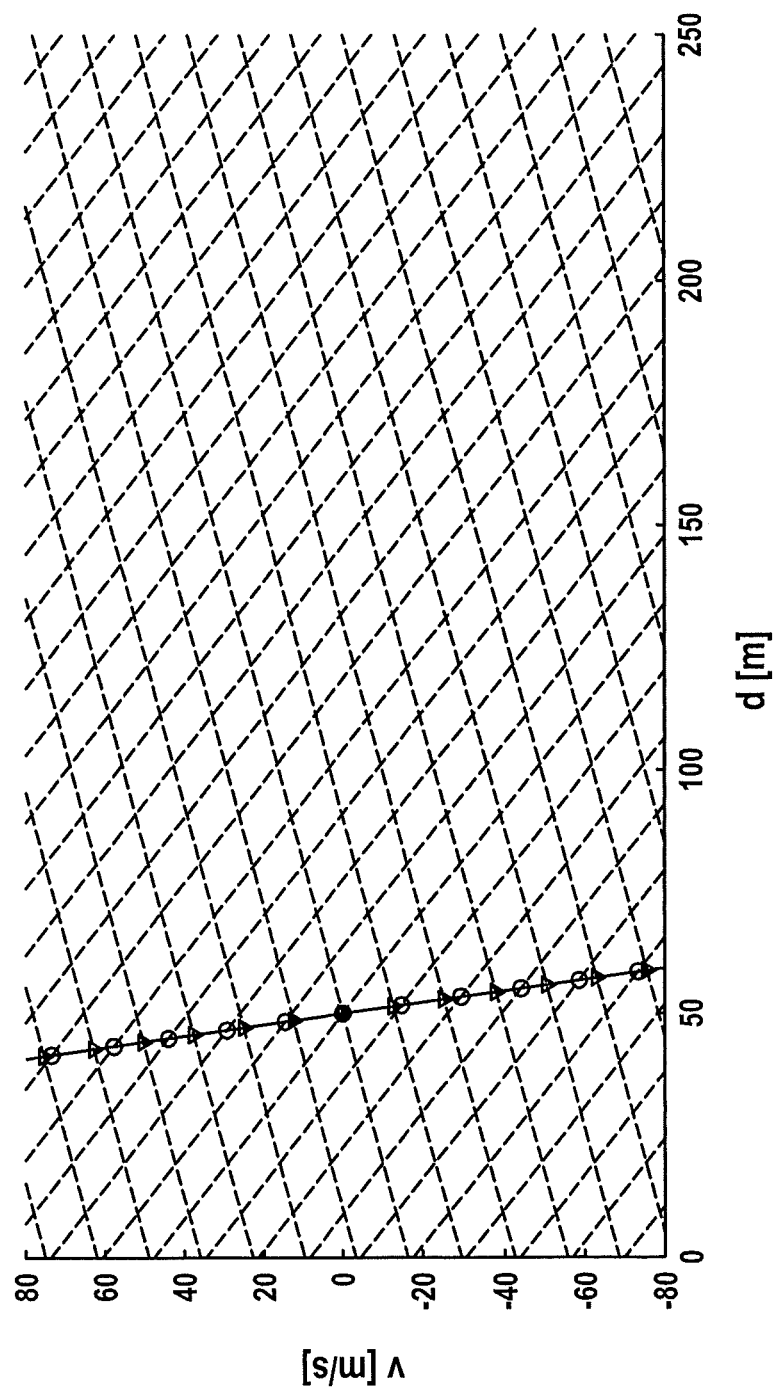

DETECTION OF RADAR OBJECTS USING A RADAR SENSOR OF A MOTOR VEHICLE

BACKGROUND OF THE INVENTION

1. Field of the Invention

The present invention relates to a method for detecting radar objects with the aid of a radar sensor of a motor vehicle, in which a measuring signal is generated by mixing a transmitted signal with a received signal, the transmitted signal having a sequence of frequency modulations.

2. Description of the Related Art

Radar sensors are used in driver assistance systems for motor vehicles, for example, in ACC (adaptive cruise control) systems or safety systems, for example, collision warning systems, and are used for the purpose of determining the positions and relative velocities of objects, so that a driving situation may be recognized. For example, in the case of an ACC system within the scope of adaptive cruise control, the velocity of one's own vehicle may be adapted to the velocity of a preceding vehicle and the distance to the preceding vehicle may be regulated to a suitable value. For example, a safety system may be configured for the purpose of automatically initiating a braking procedure if the risk of an immediately imminent collision is recognized.

FMCW (frequency-modulated continuous wave) radar sensors are known, in which the transmission frequency of a continuous radar signal is modulated in ramps. A baseband signal to be analyzed, which is analyzed, is generated from a received signal by mixing with the transmitted signal. A radar sensor typically has multiple channels, which each provide a baseband signal.

In the case of an FMCW radar sensor, each radar object in the frequency spectrum of a channel emerges in the form of a peak, whose location is a function of the Doppler shift and the runtime of the radar signals, so that unambiguous determination of the relative velocity and the distance is not yet possible from the baseband signal assigned to a frequency modulation ramp. Rather, the frequency of an obtained peak establishes a relationship between relative velocity v and distance d in the form of a linear relationship.

The term "linear" is understood hereafter to mean that the relationship thus designated may include a linear factor and an additive term.

In the case of the FMCW method, multiple frequency modulation ramps having different ramp slopes are necessary to identify multiple radar objects and estimate their relative velocities and distances. By comparing the different relationships obtained in the case of the individual frequency ramps, relative velocity v and distance d of a radar object may be calculated. This comparison is also referred to as matching and corresponds to a search for intersection points of straight lines in the v-d space. The FMCW method is particularly efficient if only a few radar objects are detected.

Radar sensors are also known which operate according to the method of chirp sequence modulation, in which the transmitted signal includes a sequence of identical, frequency-modulated signal pulses (chirps). This is a pulse Doppler method, in which initially a separation of the radar objects according to their distances takes place and subsequently, on the basis of the differences of phase relations between the reflections of the individual signal pulses, location changes and therefore velocities of the radar objects are ascertained.

Such a method is known from Published German patent application document DE 10 2005 048 209 A1.

Published international PCT patent application document WO 2011/066993 A2 also describes such a method. Three measuring cycles are carried out successively, each having different, limited unambiguous ranges both for the determination of the distance and also for the determination of the velocity. To determine a measured value for the relative velocity, a search is made for corresponding values of the measured values, which are ascertained ambiguously in each measuring cycle, for the velocity. To determine a measured value for the distance, a search is made for corresponding measured values of the various measuring cycles, the object being filtered out as an out-of-range object if no correspondence is found within an unambiguous range of a first measuring cycle.

In order to achieve precision of the determination of the relative velocity and the distance in the chirp sequence method, a high number of steep signal pulses and therefore a great computing effort during the analysis of the measurements are necessary.

BRIEF SUMMARY OF THE INVENTION

The object of the present invention is to provide a novel method for detecting radar objects with the aid of a radar sensor of a motor vehicle, which allows precise velocity and distance estimation of detected radar objects and good separability of simultaneously detected radar objects with the least possible hardware outlay and computing effort.

This object is achieved according to the present invention by a method for detecting radar objects with the aid of a radar sensor of a motor vehicle, having the following steps:

generating a measuring signal by mixing a transmitted signal with a received signal, the transmitted signal having a sequence of frequency modulations, to each of which a partial signal of the measuring signal is assigned;

ascertaining first information about the relative velocity and the distance of a radar object, based on a frequency spectrum of at least one of the partial signals, the first information including a relationship between a relative velocity and a distance of the radar object, which assigns different relative velocities to different distances;

ascertaining second information about the relative velocity and optionally the distance of the radar object, based on a frequency spectrum of a time curve of values of frequency spectra of the partial signals at a frequency position of the radar object in these frequency spectra; and ascertaining the relative velocity and the distance of the radar object, based on matching of the first information to the second information.

The time curve is preferably a curve over the sequence of the partial signals.

The first information about the relative velocity and the distance is matched with the second information. The matching of the first information with the second information includes in particular matching of the mentioned relationship between the relative velocity and the distance with the second information.

The term "matching" is to be understood to mean that a search is made for at least approximate correspondence of the information with respect to one or multiple parameters. For example, if the second information is information about the relative velocity, a search may be made for approximately corresponding relative velocities, a conclusion then being able to be made about the relationship of the first information with an associated value of the distance from a found value of the relative velocity. If both the first information and the second information include a relationship between the relative velocity and the distance of a radar object, a search may be made for an approximate correspondence of both the relative velocity and the distance, corresponding to an intersection point in the v-d space.

In particular, the first information is ascertained based on a frequency position of the radar object in the frequency spectrum of the at least one partial signal. The frequency modulations are preferably in ramps, since this simplifies the analysis. By ascertaining a relationship between the relative velocity and the distance of a radar object from a partial signal of the measuring signal, which is associated with respect to time with a frequency modulation ramp of the transmitted signal, good precision may be achieved without excess demands on the steepness of the frequency ramp. The analysis of the time curve via the sequence of the frequency modulation ramps allows matching with additional information, which may have high precision, in particular with respect to the relative velocity.

The matching of the first information with the second information preferably takes place under consideration of an ambiguity of the second information, which is determined by an unambiguous range for the relative velocity and optionally the distance. Because such ambiguities are permitted and taken into consideration, the number of the required partial signals and therefore the computing effort for the analysis may be limited, since the relationship, which is encompassed by the first information, between the parameters of the relative velocity and the distance of a radar object is restricted in the case of the matching by the ambiguous second information to certain parameter ranges or parameter points. Therefore, good precision may be achieved without excessive demands on the steepness of the frequency ramps and without excess computing effort, so that the hardware outlay may be limited.

The method preferably also includes the following step: ascertaining further first information about the relative velocity and the distance of the radar object, based on a frequency spectrum of at least one further one of the partial signals, the further first information including a relationship between a relative velocity and a distance of the radar object, which assigns different relative velocities to different distances, and the at least one partial signal and the at least one further partial signal being assigned to different frequency modulations of the transmitted signal. The ascertainment of the relative velocity and the distance of the radar object is then based on matching of the first information with the second information and with the further first information. In this way, different relationships between the relative velocity and the distance of the radar object may be obtained from the first information and the further first information, the relationships corresponding to straight lines having different slopes in the v-d space, for example. The consideration of the second information simplifies the matching of the first information with the further first information.

In one measuring cycle, the transmitted signal preferably has one sequence of frequency modulations and at least one further sequence of frequency modulations, one partial signal of the measuring signal being assigned to each of the frequency modulations of the sequences; further second information about the relative velocity and optionally the distance of the radar object based on a frequency spectrum of a time curve being ascertained from values of frequency spectra of the partial signals assigned to the at least one further sequence of frequency modulations at a frequency position of the radar object in these frequency spectra; and the ascertainment of the relative velocity and the distance of the radar object being based on matching of the first information with the second information and with the further second information. The second information and the at least one further second information preferably have different unambiguous ranges for the relative velocity or the relative velocity and the distance, and the matching of the first information with the second information and the further second information takes place under consideration of a particular ambiguity of the second information and the further second information, the ambiguity being determined by the particular unambiguous range for the relative velocity and optionally the distance. The parameter ranges or parameter points to be taken into consideration during the matching are thus further restricted, so that the matching is simplified.

Furthermore, a contribution to achieving the stated object is provided according to the present invention by a radar system for motor vehicles, which has:
a transmitted signal generating unit for generating a transmitted signal, which has a sequence of frequency modulations,
an analysis unit for analyzing received radar signals, the analysis unit being configured for the purpose of:
ascertaining first information about the relative velocity and the distance of a radar object based on a frequency spectrum of at least one partial signal of a radar signal assigned to one of the frequency modulations, the first information including a relationship between a relative velocity and a distance of the radar object, which assigns different relative velocities to different distances,
ascertaining second information about the relative velocity and optionally the distance of the radar object based on a frequency spectrum of a time curve of values of frequency spectra of partial signals, which are assigned to the frequency modulations of the transmitted signal at a frequency position of the radar object in these frequency spectra, and
ascertaining a relative velocity and a distance of the radar object based on matching of the first information with the second information.

BRIEF DESCRIPTION OF THE DRAWINGS

FIG. 9 shows a schematic view of relationships between a relative velocity v and a distance d of a radar object for another example of two sequences of frequency modulation.

DETAILED DESCRIPTION OF THE INVENTION

Figure 1:
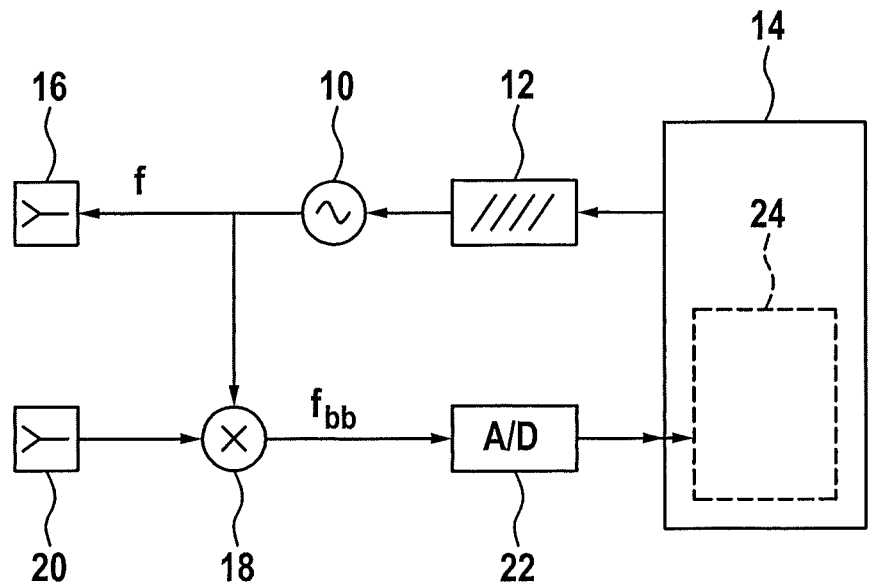
FIG. 1 shows a schematic block diagram of a radar sensor system for motor vehicles.

FIG. 1 schematically shows the construction of a radar sensor system for motor vehicles. The system includes a voltage-controlled high-frequency (HF) oscillator 10 for generating a transmitted signal. Frequency f of HF oscillator 10 is controlled by a frequency modulation device 12, which is in turn controlled by a control and analysis unit 14. One output of HF oscillator 10 is connected to at least one transmitting antenna element 16, in order to emit a transmitted signal of the radar sensor system.

Furthermore, one output of HF oscillator 10 is connected to a mixer 18. This mixer is configured for the purpose of mixing a received signal received from receiving antenna element 20 with the transmitted signal, to generate a measuring signal in the form of a baseband signal. The baseband signal is digitized by an analog digital converter 22 and supplied to control and analysis unit 14. The mixing and digitization take place while maintaining the phase relationships between the transmitted signal and the received signal. Control and analysis unit 14 includes a digital signal processing unit 24 for analyzing the time curve of frequency $f_{bb}$ of the baseband signal.

Frequency modulation device 12 is configured for the purpose, in one measuring cycle of the radar sensor system, of modulating the transmitted signal using at least one sequence of frequency modulations, in particular a sequence of frequency ramps of equal slope and equal deviation.

Figure 2:
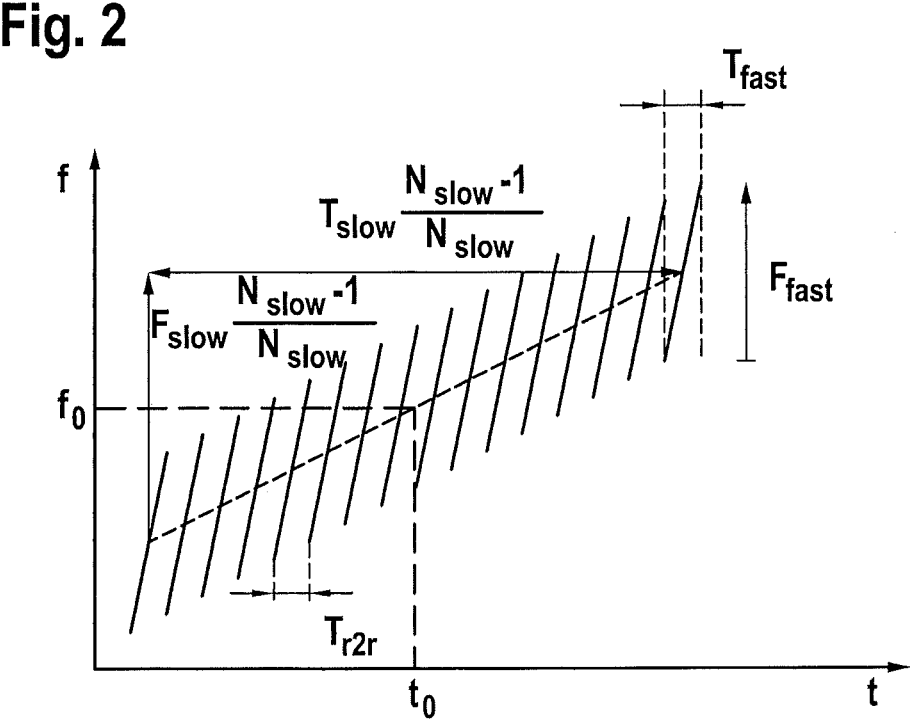
FIG. 2 shows a schematic view of a sequence of frequency modulation ramps of a transmitted signal.

In FIG. 2, frequency f of a transmitted signal is plotted over time t, as an example based on a sequence of frequency ramps, which each have a deviation $F_{fast}$ and a duration $T_{fast}$.

The individual frequency ramps of the sequence shown follow one another at a time interval $T_{r2r}$ ("ramp-to-ramp"). In the example shown in FIG. 2, $T_{r2r}$ is equal to $T_{fast}$, so that the individual frequency ramps directly follow one another.

FIG. 2 shows a general view, in which the center frequencies of the individual frequency ramps, which are also referred to as fast ramps hereafter, change in the course of the sequence. In particular, the center frequency of the fast ramps in turn describes a linear frequency ramp having center frequency $f_0$ at point in time $t_0$. This frequency ramp is also referred to as a slow ramp hereafter. It has a frequency deviation $F_{slow}$ at a ramp duration $T_{slow} = N_{slow} T_{r2r}$, $N_{slow}$ designating the number of the fast ramps.

In the case in which the slow ramp has frequency deviation $F_{slow}=0$, the fast ramps of the sequence are identical, i.e., they describe identical frequency curves.

In one measuring cycle, for example, two different sequences of fast ramps are used, within the particular sequence, the frequency modulations or fast ramps each having the identical frequency deviation $F_{fast}$ and the identical ramp duration $T_{fast}$ and a time interval $T_{r2r}$ between the ramps. The at least two sequences of one measuring cycle may differ, for example, due to different values of the absolute value and/or the sign of frequency deviation $F_{fast}$ of the fast ramps, different ramp durations $T_{fast}$ of the fast ramps, different ramp repetition times $T_{r2r}$ of the fast ramps, different center frequencies $f_0$ of the slow ramps, different numbers $N_{slow}$ of the fast ramps and/or different frequency deviations $F_{slow}$ of the slow ramps.

The analysis of the measuring signal for one sequence of frequency modulations of the transmitted signal will be initially explained hereafter to simplify the representation.

The frequency of the transmitted signal is in the range of 76 GHz, for example. For example, the center frequency of formula $f_0$ of the slow ramp may be 76 GHz.

Each fast ramp of a sequence of fast ramps is assigned a partial signal having frequency $f_{bb}(t_r)$, $t_r$ designating the time in relation to the center point of the particular fast ramp at $t_r=0$. It may be presumed that for a radar object in the detection range of the radar sensor system, the signal runtime is short in relation to ramp duration $T_{fast}$ of a fast ramp.

In a first step of the analysis, a frequency spectrum of at least one partial signal is analyzed. The partial signal of the baseband signal, which corresponds to a fast ramp, is sampled at a number $N_{fast}$ of equidistant points in time, i.e., digitized, and a frequency spectrum of the partial signal is determined. The frequency spectrum is calculated, for example, by calculating a fast Fourier transform (FFT).

Figure 3:
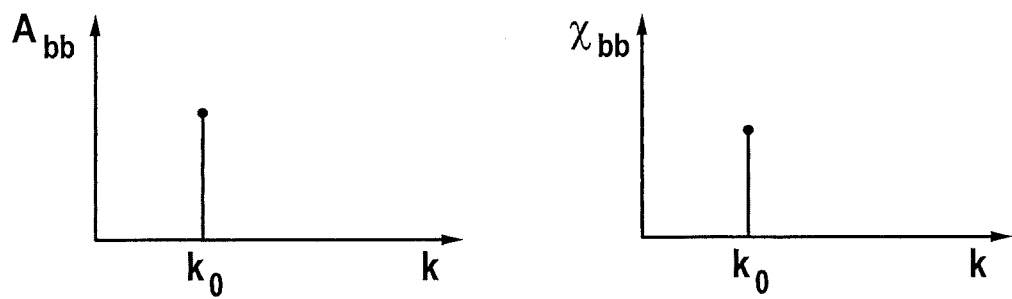
FIG. 3 shows a schematic view of amplitude and phase position of a frequency spectrum of a partial signal.

FIG. 3 schematically shows, plotted over frequency bin k, amplitude $A_{bb}(k)$ and phase $\chi_{bb}(k)$ of the obtained complex frequency spectrum in polar coordinates.

For a signal reflected from a single radar object, for example, in frequency bin $k_0$, a peak of the amplitude of the frequency spectrum is obtained, to which a corresponding phase $\chi_{bb}(k_0)$ is assigned. Frequency bin $k_0$ identifies the frequency position of the radar object in the affected frequency spectrum of the partial signal.

In the case of a linear frequency modulation of the transmitted signal, the frequency position of a peak assigned to a radar object is composed of a sum of two terms, of which the first term is proportional to the product of distance d of the radar object from the radar sensor and ramp deviation $F_{fast}$, and the second term is proportional to the product of relative velocity v of the radar object, the center frequency of the fast ramp, and ramp duration $T_{fast}$. This corresponds to the FMCW equation $$k_0 \approx \frac{2}{c}(d_{0,r}F_{fast} + f_{0,r}v_{0,r}T_{fast}),$$

where c is the speed of light, $d_{0,r}$ is the distance to the center point in time of the rth ramp, with r=1, 2, ..., $N_{slow}$, and where $f_{0,r}$ is the center frequency of the rth ramp and $v_{0,r}$ is the relative velocity of the radar object at the center point in time of the rth fast ramp. The ascertained frequency position of the peak therefore corresponds to a linear relationship between relative velocity v and distance d of the radar object. This relationship represents first information about the relative velocity and the distance of the radar object. It is a function in particular of ramp deviation $F_{fast}$, ramp duration $T_{fast}$, and center frequency $f_{0,r}$ of the fast ramps.

In the event of relative velocities v and accelerations of a radar object which are not excessively high, approximately the same frequency position of the peak results over the sequence of the fast ramps, and hereafter $k_0$ is to designate this center frequency bin of the radar object over all fast ramps of the sequence.

Phase $\chi_{bb}(k_0)$ at frequency position $k_0$, which is assigned to the peak, is particularly sensitive to changes of the distance of the radar object during the passage through the sequence of fast ramps. A distance change by half of the wavelength of the radar signal thus already results in a phase shift by an entire period of the oscillation.

Figure 4:
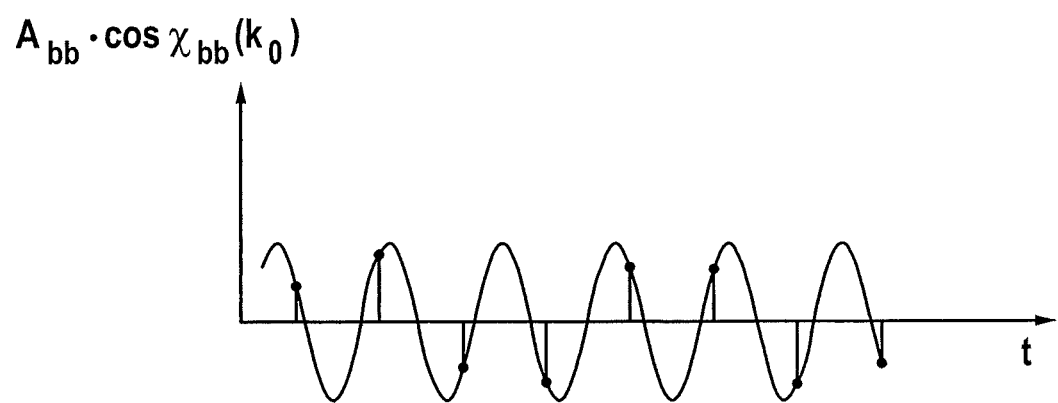
FIG. 4 shows a schematic view of values of frequency spectra of partial signals at a given frequency position.

FIG. 4 schematically shows with a solid line the time curve, which corresponds to a harmonic oscillation, of the real part of spectrum $A_{bb} \cdot \cos \chi_{bb}(k_0)$ at frequency position $k_0$ of the radar object in the frequency spectra during the course of the sequence of the fast ramps. The harmonic oscillation shown corresponds to a case without acceleration of the radar object.

At a radar signal frequency of approximately 76 GHz, the wavelength is approximately 4 mm. At a relative velocity of 86 km/h, corresponding to 24 m/s, the phase therefore changes at a frequency of 12,000 Hz. A peak corresponding to this frequency is expected in the frequency spectrum of the time curve of real part $A_{bb} \cdot \cos \chi_{bb}(k_0)$, the time curve corresponding to the successive fast ramps; each ramp corresponds to one sampling value of the time curve. If the Nyquist-Shannon sampling theorem is infringed by an excessively low sampling frequency of the phase changes, i.e., an excessively large ramp succession time $T_{r2r}$, the frequency of the phase changes thus cannot be determined unambiguously. FIG. 4 schematically shows such subsampling. The values of real part $A_{bb} \cdot \cos \chi_{bb}(k_0)$ at the center point in time of the particular fast ramps are marked. The frequency of the phase changes determined by a Fourier analysis, for example, a calculation of an FFT at the frequency position of the radar object in the frequency spectra of the fast ramps is therefore ambiguous. A Fourier analysis is understood in particular as the calculation of at least one Fourier coefficient of a Fourier series.

The frequency position of the harmonic oscillation corresponding to the phase change may be specified by its frequency bin $l_0$ and is approximately additively composed of a term proportional to mean distance d and to ramp deviation $F_{slow}$ of the slow ramp and a term which is proportional to mean relative velocity v, ramp duration $T_{slow}$ of the slow ramp, and mean frequency $f_0$ of the slow ramp. This in turn corresponds to an FMCW equation for the slow ramp:

$$l_0 \approx \frac{2}{c}(dF_{slow} + vT_{slow}f_0).$$

In the general case, i.e., with a ramp deviation of slow ramp $F_{slow} \neq 0$, a linear relationship between relative velocity v and distance d of the radar object therefore results from ascertained frequency position $l_0$, which is ambiguous with respect to relative velocity v and distance d, however. This relationship represents second information about the relative velocity and the distance of the radar object. In the special case $F_{slow}=0$, a slow ramp is nonetheless referred to hereafter; it has the slope 0 and only results in second information about velocity v. This is unambiguous with respect to relative velocity v up to integral multiples of the product of the half wavelength and sampling frequency $1/T_{r2r}$ of the slow ramp.

Figure 5:
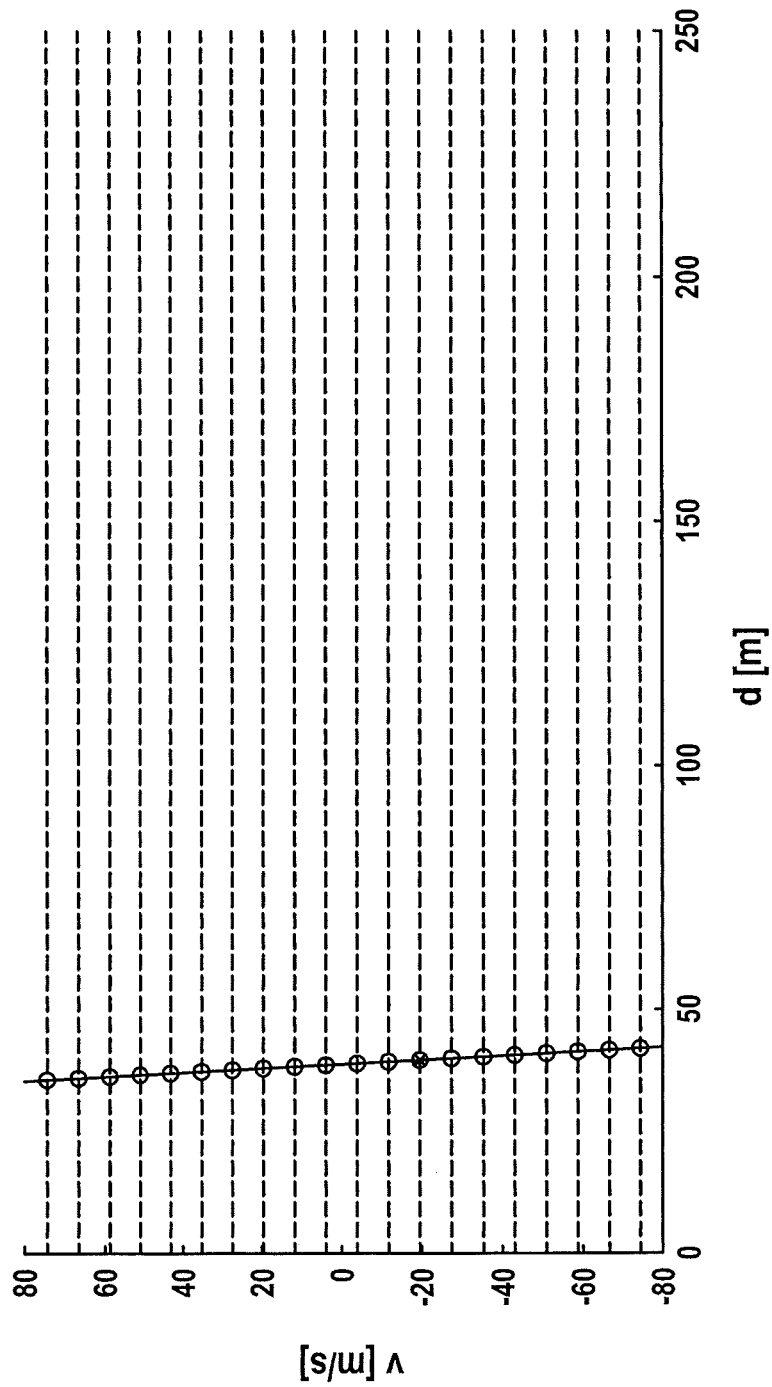
FIG. 5 shows a schematic view of relationships between a relative velocity v and a distance d of a radar object from an analysis of partial signals, which are assigned to a sequence of similar frequency ramps.

FIG. 5 shows an example of the information, which is provided from the analysis of the measuring signal for a sequence of frequency ramps, about relative velocity v and distance d. The parameters of the frequency modulation are as follows: $F_{fast}=425$ MHz, $T_{fast}=0.25$ ms, each fast ramp is sampled at $N_{fast}=512$ sampling points in time, the frequency deviation of the slow ramp is $F_{slow}=0$, the time interval of the fast ramps is $T_{r2r}=0.25$ ms, the number of the fast ramps, i.e., the number of the sampling points in time of the slow ramps, is $N_{slow}=16$, so that a duration of the slow ramps of $T_{slow}=4$ ms results. The detected radar object has a distance of d=40 m and a relative velocity v=−20 m/s.

From the analysis of a frequency spectrum of a partial signal, the straight line inclined with respect to the vertical results, corresponding to a linear relationship between relative velocity v and distance d. Since the ramp deviation of slow ramp is $F_{slow}=0$, an ambiguous value for relative velocity v results from the Fourier analysis of the values of the frequency spectra of the partial signals at frequency position $k_0$ of the radar object, corresponding to the horizontal lines shown by dashed lines lying at a constant distance to one another in the graph of FIG. 5. This ambiguous value represents the second information about the relative velocity. By matching the first information with the second information under consideration of the mentioned ambiguity, potential value pairs (v, d) result. These are identified with circles in FIG. 5, which illustrate a tolerance range for carrying out the matching. The real target at v=−20 m/s is marked with a star.

An unambiguousness of the ascertainment of the relative velocity and the distance of the radar object may be produced by taking into consideration further first information about the relative velocity and the distance and/or further second information about the relative velocity and optionally the distance.

Figure 6:
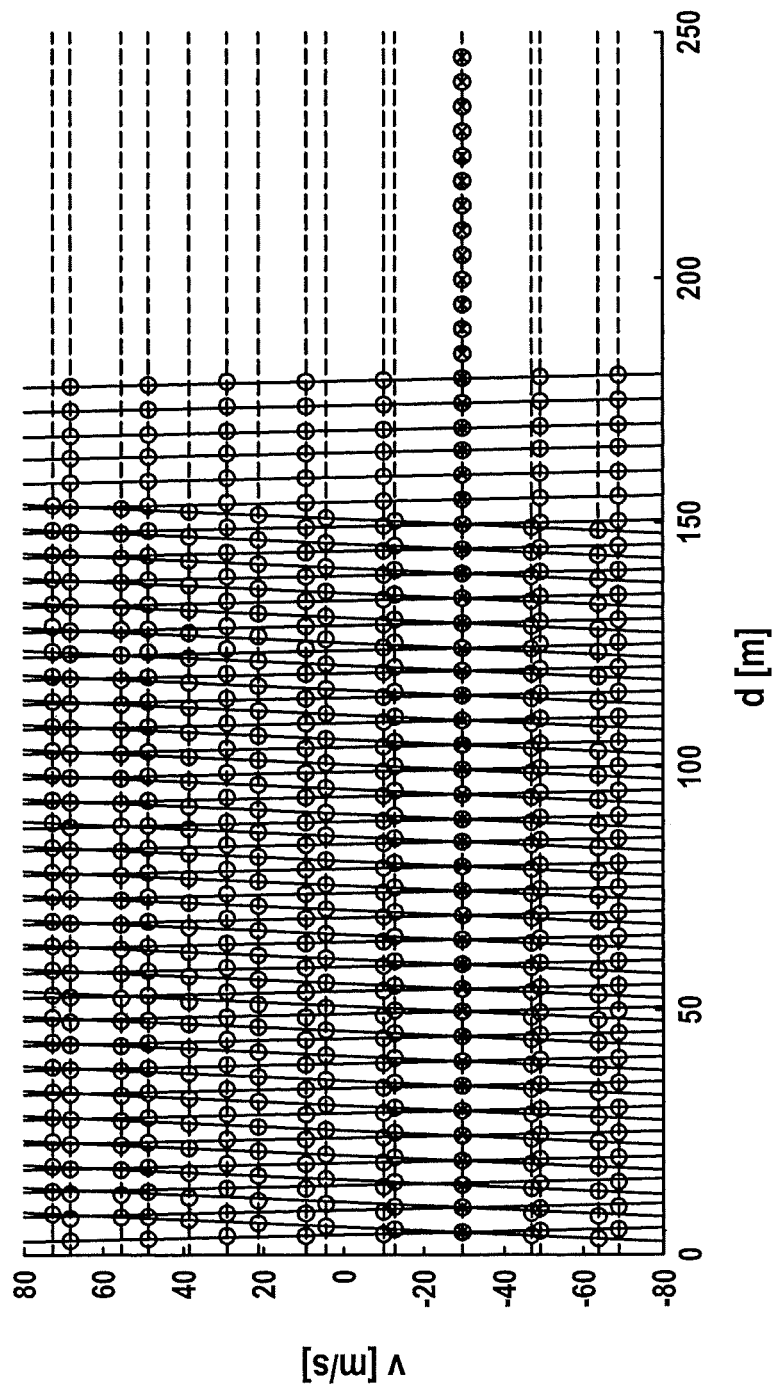
FIG. 6 shows a schematic view to explain matching of different ascertained relationships between v and d from partial signals, which are assigned to two sequences of frequency ramps.

FIG. 6 schematically shows an unambiguous ascertainment of the relative velocity and the distance of radar objects if two different sequences of frequency ramps are used to modulate the transmitted signal in each measuring cycle.

The parameters of the first sequence of frequency modulations are as follows: $F_{fast}=425$ MHz, $T_{fast}=0.10$ ms, $N_{fast}=1024$, $F_{slow}=0$, $T_{r2r}=0.10$ ms, $N_{slow}=32$, so that $T_{slow}=3.2$ ms results.

The parameters of the second sequence of frequency modulations are as follows: $F_{fast}=-250$ MHz, $T_{fast}=0.115$ ms, $N_{fast}=512$, $F_{slow}=0$, $T_{r2r}=0.115$ ms, $N_{slow}=32$, so that $T_{slow}=3.68$ ms results.

In this example, it is assumed that a series of radar objects are present at a relative velocity of v=−30 m/s in the distance range from d=5 m to d=250 m, the radar objects each having a distance of 5 m to one another. For example, these may be stationary targets, toward which one's own motor vehicle moves at a velocity of 30 m/s.

The linear relationship between v and d, which results for each radar object as the first information, differs for the two sequences of frequency ramps. This corresponds to straight lines of different slopes and different signs in the v-d graph. Furthermore, the second items of information about velocity v of the radar object, which are ascertained from the first sequence and the second sequence of the frequency ramps, have different ambiguity ranges.

In FIG. 6, the intersection points of the straight lines ascertained from a single sequence of the frequency modulations are identified with circles as in FIG. 5. The values of relative velocity v and distance d which correspond best upon the matching of the information are ascertained as the values of the relative velocity and the distance of a particular radar object.

The matching may take place, for example, in that firstly for a single sequence of frequency modulations, matching of the first information with the second information is initially carried out, and then for the matched items of information obtained for the particular sequence, further matching with one another is carried out. This would correspond in the schematic view of FIG. 6 to matching of the particular points of intersection identified by circles from the first sequence of frequency modulation with the points of intersection, which are also identified by circles, from the second sequence of frequency modulations.

The chain of the stationary radar objects at a relative velocity of v=−30 m/s may be resolved and detected up to a distance of 150 m.

It is particularly advantageous that in the case of $F_{slow}=0$, by a choice of the unambiguous ranges for the relative velocity of the particular sequence of frequency modulations, the choice being adapted to the intrinsic velocity of one's own vehicle, it may be ensured that in the v-d graph, the range at v=0 m/s remains free. This makes it easier to simultaneously detect stationary targets and a preceding vehicle which is tracked by a distance and cruise control unit, for example, at a relative velocity of approximately 0 m/s. For example, the sampling time intervals of the slow ramp, i.e., ramp intervals $T_{r2r}$ of the fast ramps, are selected in such a way that the intrinsic velocity of one's own vehicle does not correspond with an integral multiple of unambiguous range $v_{unamb}$ of the velocity, which may be expressed as $$v_{unamb} = \frac{1}{T_{r2r}} \cdot \frac{c}{2f_0}.$$

In that by establishing $F_{slow}=0$, the second information is only information about the relative velocity of the radar object, corresponding to a horizontal straight line in the v-d graph, in general depending on the selection of the unambiguous ranges, desired velocity difference ranges may be "kept free." In particular, it may be ensured, for example, that the relative velocity of a stationary radar object may be unambiguously differentiated from the relative velocity of a directly preceding vehicle. For this purpose, for example, for each sequence of frequency modulations of a measuring cycle, an unambiguous range for the relative velocity is selected in such a way that the unambiguous range is not an integral multiple of the velocity difference of the radar objects to be detected simultaneously, i.e., in the described example in particular the velocity difference between the directly preceding vehicle and a stationary radar object.

Further details of the examples explained on the basis of FIG. 1 through FIG. 6 and modifications and refinements are explained in greater detail hereafter.

Upon matching according to FIG. 6 of the first information with the second information, which are obtained from the first sequence of frequency modulations, with the first information and second information, which are obtained from the second sequence of frequency modulations, the movement of the radar object during the period of time of the time offset between the first and second sequences is preferably taken into consideration. For this purpose, for example, the distance information from the first measurement may be adapted according to the particular assigned relative velocity.

Figure 7:
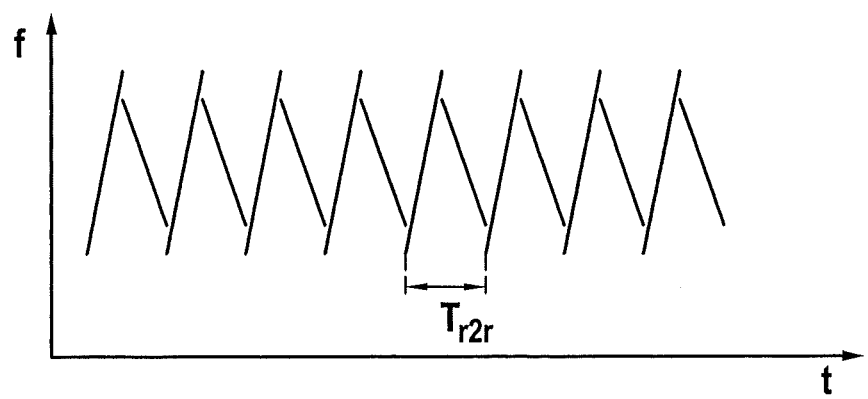
FIG. 7 shows a schematic view of two interleaved sequences of frequency ramps.

FIG. 7 schematically shows frequency modulations of a transmitted signal, in which in each measuring cycle the transmitted signal is modulated using two sequences of frequency ramps, the two sequences being interleaved with respect to time. Within each of the two sequences, the frequency ramps are identical, for example, with respect to frequency deviation $F_{fast}$, ramp duration $T_{fast}$, and in the case shown also with respect to their center frequency. In the illustrated example, the center frequencies of all frequency ramps are identical, while the sequences differ from one another due to different frequency deviations $F_{fast}$ and different ramp durations $T_{fast}$ of the fast ramps. For both sequences, ramp interval $T_{r2r}$ is at least equal to the sum of one ramp duration of a fast ramp of the first sequence and one ramp duration of a fast ramp of the second sequence. Every second one of the fast ramps is therefore used for carrying out the Fourier analysis of values of frequency spectra of the partial signals of a particular sequence of frequency ramps at the frequency position of a radar object in the affected frequency spectra of the sequence. Due to this quasi-simultaneity of the measurement using the first sequence and the second sequence of frequency modulations, for example, a movement of the radar object may be neglected, upon matching of the information about the relative velocity and the distance between the sequences.

Control and analysis unit 14 may be configured for the purpose of adapting the number of the frequency modulations per sequence as a function of a recognized traffic situation. In particular, an adaptation to the number of the radar objects detected in the detection range of the radar sensor system may take place. It is advantageous in particular if in the event of a decrease in the number of the detected radar objects, a decrease in the number of frequency modulations (fast ramps) within a sequence occurs. Thus, for example, the precision of the detection may be increased by appropriate adaptation of the ramp parameters, and/or the computing effort may be reduced and computing power may be used in another way.

For the Fourier analysis of values of frequency spectra of the partial signals at the frequency position of a radar object in the affected frequency spectra, for example, the real part, the imaginary part, or the complex value of the frequency spectrum of the particular partial signal at the frequency position of the radar object may be used.

The calculation of the frequency spectra of the partial signals and the Fourier analysis of values of the frequency spectrum of the partial signals may also be combined, for example, to form a two-dimensional Fourier analysis of the partial signals.

The parameters of the fast ramp, i.e., ramp deviation $F_{fast}$ and ramp duration $T_{fast}$ and in particular number of the sampling values per fast ramp $N_{fast}$, are preferably selected in such a way that sufficiently large unambiguous ranges for the determination of the relative velocity and the distance result for the expected distance and relative velocity ranges.

Preferably, if two or more sequences of frequency modulations are used in one measuring cycle, unambiguous ranges for the relative velocity of the second information are selected in such a way that within one analysis range of relative velocity v, which corresponds, for example, to the relative velocities to be expected in routine traffic situations, no correspondences occur between integral multiples of the particular unambiguous ranges. In particular, the unambiguous ranges are to be selected in such a way that the larger unambiguous range is not an integral multiple of the smaller unambiguous range. In this way, the detectable velocity range is enlarged.

Figure 8:
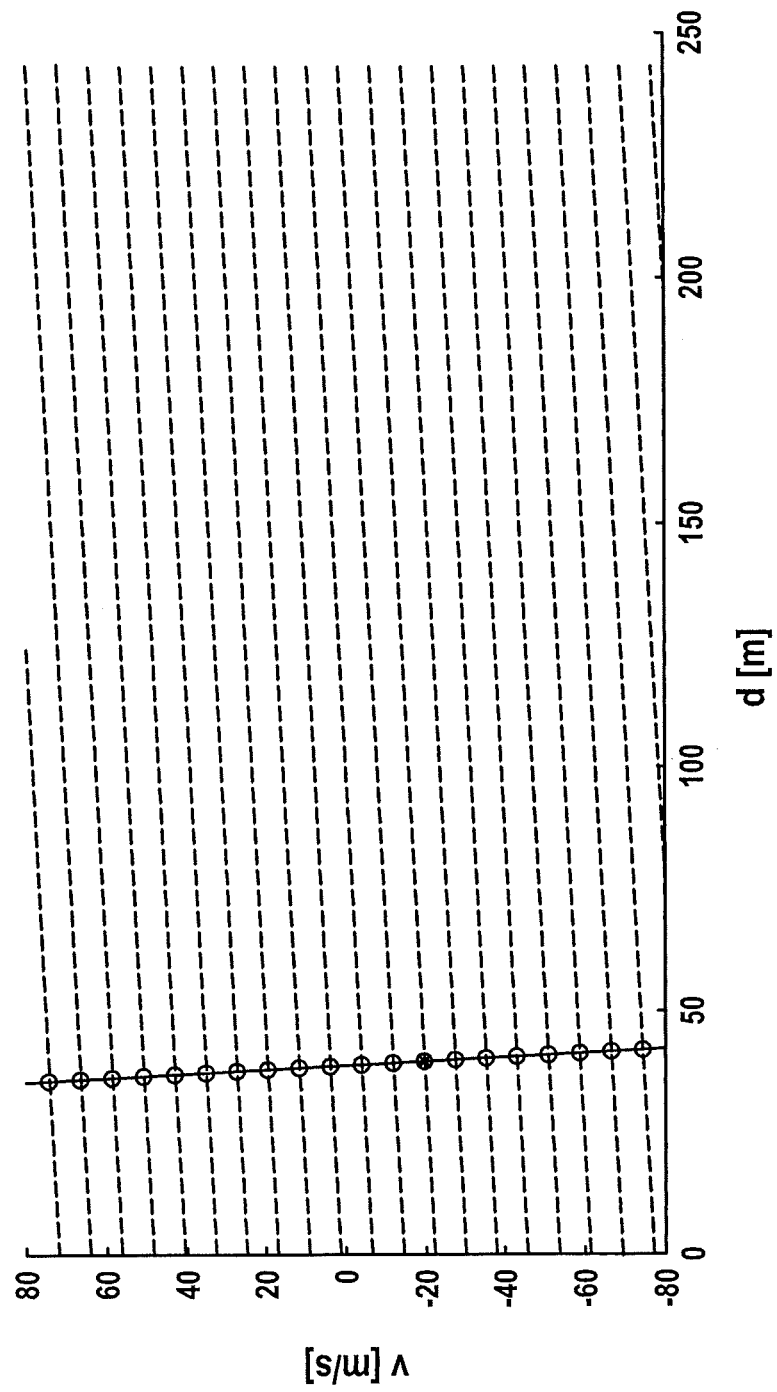
FIG. 8 shows a schematic view corresponding to FIG. 5 for another example of a sequence of frequency modulations.

FIG. 8 shows another example of a v-d graph of the first information and second information from partial signals which correspond to a sequence of frequency modulations according to FIG. 2. Notwithstanding the example of FIG. 5, the slow ramp has a frequency deviation $F_{slow} \neq 0$ here. Frequency deviation $F_{fast}$ of the fast ramp and frequency deviation $F_{slow}$ of the slow ramp have opposite signs. This is advantageous insofar as it improves the precision of the matching of the first information and the second information.

It is also conceivable for ascertaining second information about the relative velocity and optionally the distance of the radar object to make use of the values of frequency spectra of the partial signals for two sequences of frequency modulation. The frequency position of the radar object in the frequency spectra of the partial signals then corresponds to different frequency bins for the frequency spectra, which are assigned to the first sequence, and the frequency spectra, which are assigned to the second sequence. Therefore, from one measuring cycle, first information about the relative velocity and the distance of a radar object may be ascertained based on a frequency spectrum of at least one partial signal of a first sequence of frequency modulations, further information about the relative velocity and the distance of the radar object may be ascertained based on a frequency spectrum of at least one partial signal of a second sequence of frequency modulations, and second information about the relative velocity and optionally the distance of the radar object is ascertained based on a Fourier analysis of values of the frequency spectra of the partial signals, which are assigned to the sequence of frequency modulations and the further sequence of frequency modulations, at one frequency position of the radar object in the frequency spectra. The relative velocity and the distance of the radar object are ascertained based on matching of the first information and the further information with the second information. To ascertain the second information, for example, arbitrary combinations of the frequency positions of peaks in the frequency spectra of the partial signals of the first sequence may be combined with frequency positions of peaks in the frequency spectra of the partial signals of the second sequence for the Fourier analysis, if, in the case of multiple radar objects in the detection range of the radar sensor system, an assignment of frequency positions of peaks to individual radar objects is not yet possible.

FIG. 9 shows another example of a v-d graph of the first information, second information, and further second information from partial signals which correspond to two sequences of frequency modulations according to FIG. 2. In this example, the fast ramps of both sequences have the same frequency deviation $F_{fast}$ and the same ramp duration $T_{fast}$, so that approximately the same straight line corresponding to the first information results. This straight line is slightly inclined in relation to the vertical in the graph shown.

The second information and the further second information are shown in the form of dashed straight lines and are in turn ambiguous. They have different unambiguous ranges for the determination of the relative velocity and the distance of a radar object, i.e., adjacent straight lines of the FMCW equation of the particular slow ramp in the v-d space are not parallel and/or have different distances to one another than adjacent straight lines of the FMCW equation of the other slow ramp in the v-d space.

The slow ramps differ with respect to ramp deviation $F_{slow}$. Ramp succession time $T_{r2r}$ is identical for both sequences, and $T_{slow}$ is also. In consideration of the first information, i.e., for the parameter points (v, d) or ranges of the second information resulting in each case upon matching with the first information, the second information and the further second information have different unambiguous ranges for relative velocity (v). Triangles mark a match of the first information with the second information. Circles mark a match of the first information with the further second information.

Matching of the correspondence ranges is then carried out. A radar object is detected at v=0 m/s and d=50 m.

Preferably, $F_{slow} \neq 0$ applies for both slow ramps, particularly preferably with different signs, so that the matching is improved. Ramp center frequency $f_0$ of the slow ramps may be identical for both sequences, for example.

What is claimed is:

1. A method for detecting a radar object with the aid of a frequency modulated continuous wave (FMCW) radar sensor of a motor vehicle, comprising:
   generating, via an analysis unit, a measuring signal by mixing a transmitted signal with a received signal, as received by the analysis unit, the transmitted signal having a sequence of frequency modulations, wherein a partial signal of the measuring signal is assigned to each one of the frequency modulations;
   ascertaining, via the analysis unit, first information about a relative velocity and a distance of a radar object, based on a frequency spectrum of at least one of the partial signals, the first information including a relationship between the relative velocity and the distance of the radar object, which relationship assigns different relative velocities to different distances;
   ascertaining, via the analysis unit, second information about the relative velocity and the distance of the radar object, based on a frequency spectrum of a time curve of values of frequency spectra of the partial signals at a frequency position of the radar object in the frequency spectra of the partial signals; and
   ascertaining, via the analysis unit, the relative velocity and the distance of the radar object, based on matching of the first information with the second information;
   wherein in one measuring cycle the transmitted signal has a first sequence of frequency modulations and at least one second sequence of frequency modulations, a partial signal of the measuring signal being assigned to each of the frequency modulations of the two sequences,
   wherein a relationship between the relative velocity and the distance, which results for the radar object as the first information, differs for two sequences of frequency ramps, and wherein the second information about the relative velocity of the radar object, which are ascertained from the first sequence and the second sequence of the frequency ramps, have different ambiguity ranges, and wherein the frequency modulations are in a fast ramp and a slow ramp,
   wherein the sequence of frequency modulations of the transmitted signal is a sequence of frequency modulations in the form of linear frequency ramps having a ramp center frequency which changes linearly as a function of time,
   wherein (i) the change with respect to time of the ramp center frequency within the sequence and (ii) the individual frequency ramps of the sequence have opposite signs, and
   wherein if at least two sequences of frequency modulations are used in one measuring cycle, unambiguous ranges for the relative velocity of the second information are selected so that within one analysis range of relative velocity, no correspondences occur between integral multiples of the particular unambiguous ranges.

2. The method as recited in claim 1, wherein the matching of the first information with the second information is carried out under consideration of an ambiguity of the second information, and wherein the ambiguity of the second information is defined by unambiguous ranges for the relative velocity and the distance.

3. The method as recited in claim 1, further comprising:
ascertaining further first information about the relative velocity and the distance of the radar object, based on a frequency spectrum of at least one further one of the partial signals, the further first information including a relationship between a relative velocity and a distance of the radar object, which relationship assigns different relative velocities to different distances, and the at least one partial signal and the at least one further partial signal being assigned to different frequency modulations of the transmitted signal;
wherein the ascertainment of the relative velocity and the distance of the radar object is based on matching of the first information with the second information and with the further first information.

4. The method as recited in claim 3, wherein:
the different frequency modulations are linear frequency ramps; and
the different frequency modulations differ with respect to at least one of a frequency deviation, a ramp duration, and a center frequency of each respective frequency ramp.

5. The method as recited in claim 4, wherein:
further second information about the relative velocity and the distance of the radar object is ascertained based on a frequency spectrum of a time curve of values of frequency spectra of the partial signals, which are assigned to the at least one second sequence of frequency modulations, at a frequency position of the radar object in the frequency spectra of the partial signals; and
the ascertainment of the relative velocity and the distance of the radar object is based on matching of the first information with the second information and with the further second information.

6. The method as recited in claim 5, wherein the further second information has associated unambiguous ranges for the relative velocity and the distance, which ranges differ from the unambiguous ranges for the relative velocity and the distance of the second information, and the matching of the first information with the second information and the further second information is carried out under consideration of ambiguity of the second information which is defined by the unambiguous ranges for the relative velocity and distance of the second information.

7. The method as recited in claim 6, wherein:
the second information is information about the relative velocity of the radar object; and
the unambiguous range for the relative velocity of the second information is selected in such a way that intrinsic velocity of the motor vehicle does not correspond to an integral multiple of the unambiguous range for the relative velocity of the second information.

8. The method as recited in claim 5, wherein:
the frequency modulations of the first sequence differ from the frequency modulations of the second sequence;
the at least one partial signal and the at least one further partial signal being assigned to frequency modulations of the transmitted signal from different sequences; and
matching of the first information is carried out with the second information and with the further first information and the further second information.

9. The method as recited in claim 2, wherein in a selected sequence of frequency modulations of the transmitted signal, the frequency modulations each have the same center frequency, and the second information is information about the relative velocity of the radar object.

10. A frequency modulated continuous wave (FMCW) radar sensor system for a motor vehicle, comprising:
a transmitted-signal generation device generating a transmitted signal which has a sequence of frequency modulations;
an analysis unit analyzing received radar signals, wherein the analysis unit is configured to perform the following:
ascertain first information about a relative velocity and a distance of a radar object, based on a frequency spectrum of at least one of the partial signals, the first information including a relationship between the relative velocity and the distance of the radar object, which relationship assigns different relative velocities to different distances;
ascertain second information about the relative velocity and the distance of the radar object, based on a frequency spectrum of a time curve of values of frequency spectra of the partial signals at a frequency position of the radar object in the frequency spectra of the partial signals; and
ascertain the relative velocity and the distance of the radar object, based on matching of the first information with the second information;
wherein in one measuring cycle the transmitted signal has a first sequence of frequency modulations and at least one second sequence of frequency modulations, a partial signal of the measuring signal being assigned to each of the frequency modulations of the two sequences, and wherein a relationship between the relative velocity and the distance, which results for the radar object as the first information, differs for two sequences of frequency ramps, and wherein the second information about the relative velocity of the radar object, which are ascertained from the first sequence and the second sequence of the frequency ramps, have different ambiguity ranges, and wherein the frequency modulations are in a fast ramp and a slow ramp,
wherein the sequence of frequency modulations of the transmitted signal is a sequence of frequency modulations in the form of linear frequency ramps having a ramp center frequency which changes linearly as a function of time,
wherein (i) the change with respect to time of the ramp center frequency within the sequence and (ii) the individual frequency ramps of the sequence have opposite signs, and
wherein if at least two sequences of frequency modulations are used in one measuring cycle, unambiguous ranges for the relative velocity of the second information are selected so that within one analysis range of relative velocity, no correspondences occur between integral multiples of the particular unambiguous ranges.

11. The radar system as recited in claim 10, wherein the matching of the first information with the second information is carried out under consideration of an ambiguity of the second information, and wherein the ambiguity of the second information is defined by unambiguous ranges for the relative velocity and the distance.

12. The radar system as recited in claim 10, wherein the analysis unit is further configured to:
ascertain further first information about the relative velocity and the distance of the radar object, based on a frequency spectrum of at least one further one of the partial signals, the further first information including a relationship between a relative velocity and a distance of the radar object, which relationship assigns different relative velocities to different distances, and the at least one partial signal and the at least one further partial signal being assigned to different frequency modulations of the transmitted signal;

wherein the ascertainment of the relative velocity and the distance of the radar object is based on matching of the first information with the second information and with the further first information.

13. The method as recited in claim 1, wherein a slow FMCW equation for the slow ramp is: $l_0 \approx 2/c(dF_{slow} + vT_{slow}f_0)$, where frequency bin is $l_0$, mean distance is d, ramp deviation is $F_{slow}$, mean relative velocity is v, ramp duration is $T_{slow}$, and mean frequency is $f_0$, and wherein a fast FMCW equation for the fast ramp is: $k_0 \approx 2/c(d_{o,r}F_{fast} + f_{0,r}v_{o,r}T_{fast})$, where c is the speed of light, $d_{0,r}$ is the distance to the center point in time of the rth ramp, with r= 1, 2, ..., $N_{slow}$, $f_{0,r}$ is the center frequency of the rth ramp, $v_{0,r}$ is the relative velocity of the radar object at the center point in time of the rth fast ramp, ramp deviation is $F_{fast}$, ramp duration is $T_{fast}$, and center frequency is $f_{0,r}$ of the fast ramp.

14. The radar system as recited in claim 10, wherein a slow FMCW equation for the slow ramp is: $l_0 \approx 2/c(dF_{slow} + vT_{slow}f_0)$, where frequency bin is $l_0$, mean distance is d, ramp deviation is $F_{slow}$, mean relative velocity is v, ramp duration is $T_{slow}$, and mean frequency is $f_0$, and wherein a fast FMCW equation for the fast ramp is: $k_0 \approx 2/c(d_{o,r}F_{fast} + f_{0,r}v_{o,r}T_{fast})$, where c is the speed of light, $d_{0,r}$ is the distance to the center point in time of the rth ramp, with r= 1, 2, ..., $N_{slow}$, $f_{0,r}$ is the center frequency of the rth ramp, $v_{0,r}$ is the relative velocity of the radar object at the center point in time of the rth fast ramp, ramp deviation is $F_{fast}$, ramp duration is $T_{fast}$, and center frequency is $f_{0,r}$ of the fast ramp.

* * * * *